(12) United States Patent
Hathorn et al.

(10) Patent No.: US 9,983,813 B2
(45) Date of Patent: *May 29, 2018

(54) MAINTENANCE OF A FABRIC PRIORITY DURING SYNCHRONOUS COPY OPERATIONS

(71) Applicant: INTERNATIONAL BUSINESS MACHINES CORPORATION, Armonk, NY (US)

(72) Inventors: Roger G. Hathorn, Tucson, AZ (US); Bret W. Holley, Tucson, AZ (US); Harry M. Yudenfriend, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/242,374

(22) Filed: Aug. 19, 2016

(65) Prior Publication Data

US 2016/0357468 A1 Dec. 8, 2016

Related U.S. Application Data

(63) Continuation of application No. 14/318,012, filed on Jun. 27, 2014, now Pat. No. 9,491,240.

(51) Int. Cl.
*G06F 3/06* (2006.01)
*H04L 29/08* (2006.01)
(Continued)

(52) U.S. Cl.
CPC .............. *G06F 3/0619* (2013.01); *G06F 3/06* (2013.01); *G06F 3/065* (2013.01); *G06F 3/0605* (2013.01);
(Continued)

(58) Field of Classification Search
CPC ..... H04L 67/1097; H04L 47/24; H04L 49/00; H04L 49/357; G06F 15/167;
(Continued)

(56) References Cited

U.S. PATENT DOCUMENTS 6,000,020 A 12/1999 Chin et al.
6,253,260 B1 6/2001 Beardsley et al.
(Continued)

OTHER PUBLICATIONS

Final Office Action dated Aug. 5, 2016, pp. 13, for U.S. Appl. No. 14/317,464, filed Jun. 27, 2014.
(Continued)

*Primary Examiner* — Alina A Boutah
(74) *Attorney, Agent, or Firm* — Rabindranath Dutta; Konrad Raynes Davda & Victor LLP

(57) ABSTRACT

A primary storage controller receives a write command from a host, wherein Fiber Channel frames corresponding to the write command have a priority indicated by the host. The primary storage controller performs a synchronous copy operation to copy data written by the write command from the primary storage controller to a secondary storage controller, wherein Fiber Channel frames corresponding to the synchronous copy operations have an identical priority to the priority indicated by the host.

15 Claims, 14 Drawing Sheets

(51) Int. Cl.
  *G06F 15/167* (2006.01)
  *G06F 17/30* (2006.01)
  *H04L 12/931* (2013.01)

(52) U.S. Cl.
  CPC ............ *G06F 3/067* (2013.01); *G06F 15/167* (2013.01); *G06F 17/30581* (2013.01); *H04L 49/00* (2013.01); *H04L 49/357* (2013.01); *H04L 67/1097* (2013.01)

(58) Field of Classification Search
  CPC .... G06F 17/30581; G06F 3/06; G06F 3/0605; G06F 3/0619; G06F 3/065; G06F 3/067
  USPC .................................. 370/389, 392; 709/213
  See application file for complete search history.

(56) References Cited

U.S. PATENT DOCUMENTS

| | | | |
|---|---|---|---|
| 7,409,586 B1 * | 8/2008 | Bezbaruah | G06F 11/0727 714/13 |
| 7,606,986 B1 | 10/2009 | Limaye et al. | |
| 7,721,022 B2 | 5/2010 | Brewer et al. | |
| 7,843,907 B1 | 11/2010 | Abou-Emara et al. | |
| 8,032,730 B2 | 10/2011 | Hara | |
| 8,160,072 B1 * | 4/2012 | Gnanasekaran | H04L 47/2441 370/229 |
| 8,504,670 B2 | 8/2013 | Wu et al. | |
| 8,537,706 B2 | 9/2013 | Cardona et al. | |
| 8,762,416 B1 | 6/2014 | Corbett | |
| 2004/0042459 A1 * | 3/2004 | Chen | H04N 7/52 370/395.4 |
| 2004/0085994 A1 | 5/2004 | Warren et al. | |
| 2005/0047334 A1 * | 3/2005 | Paul | H04L 12/5601 370/229 |
| 2005/0102479 A1 * | 5/2005 | Innan | G06F 3/0607 711/162 |
| 2005/0114460 A1 * | 5/2005 | Chen | G06F 9/5038 709/207 |
| 2005/0281196 A1 * | 12/2005 | Tornetta | H04L 45/00 370/235 |
| 2005/0289197 A1 * | 12/2005 | Kan | G06F 11/2097 |
| 2006/0034302 A1 * | 2/2006 | Peterson | H04L 45/04 370/401 |
| 2006/0215663 A1 * | 9/2006 | Banerjee | H04L 41/5045 370/395.21 |
| 2007/0180168 A1 | 8/2007 | Chikusa et al. | |
| 2008/0008202 A1 * | 1/2008 | Terrell | H04L 45/00 370/401 |
| 2008/0288949 A1 | 11/2008 | Bohra et al. | |
| 2009/0316721 A1 | 12/2009 | Kanda | |
| 2010/0250785 A1 | 9/2010 | Shin et al. | |
| 2011/0173609 A1 | 7/2011 | Buragohain et al. | |
| 2012/0159097 A1 * | 6/2012 | Jennas, II | G06F 3/0611 711/162 |
| 2014/0105602 A1 * | 4/2014 | Kawamura | H04L 12/4641 398/66 |
| 2014/0258658 A1 | 9/2014 | Best et al. | |
| 2015/0339180 A1 * | 11/2015 | Shih | G06F 11/0793 714/49 |
| 2015/0381529 A1 | 12/2015 | Hathorn et al. | |
| 2015/0381530 A1 | 12/2015 | Hathorn et al. | |
| 2015/0381726 A1 | 12/2015 | Hathorn et al. | |

OTHER PUBLICATIONS

Notice of Allowance dated Nov. 22, 2016, pp. 22, for U.S. Appl. No. 14/317,517, filed Jun. 27, 2014.
Notice of Allowance dated Jan. 4, 2017, pp. 9, for U.S. Appl. No. 14/317,464, filed Jun. 27, 2014.
"Fibre Channel SIngle-Byte Command Code Sets Mapping Protocol—5 (FC-SB-5)", Rev. 2.00, Mar. 26, 2013, INCITS Working Draft proposed American National Standard for Information Technology, pp. 269.
"Fibre Channel Link Services (FC-LS-3)", Rev. 3.10, Feb. 1, 2014, INCITS Working Draft proposed American National Standard for Information Technology, pp. 207.
"Fibre Channel Framing and Signaling—4 (FC-FS-4)", Rev. 0.50, May 16, 2014, INCITS Working Draft proposed American National Standard for Information Technology, pp. 448.
U.S. Appl. No. 14/317,464, filed Jun. 27, 2014.
Office Action dated Apr. 19, 2016, pp. 15, for U.S. Appl. No. 14/317,464, filed Jun. 27, 2014.
Response dated Jul. 19, 2016, pp. 9, to Office Action dated Apr. 19, 2016, pp. 15, for U.S. Appl. No. 14/317,464 filed Jun. 27, 2014.
U.S. Appl. No. 14/317,517, filed Jun. 27, 2014.
Office Action dated Apr. 29, 2016, pp. 19, for U.S. Appl. No. 14/317,517, filed Jun. 27, 2014.
Response dated Jul. 29, 2016, pp. 12, to Office Action dated Apr. 29, 2016, pp. 19, for U.S. Appl. No. 14/317,517 filed Jun. 27, 2014.
U.S. Appl. No. 14/318,012, filed Jun. 27, 2014.
Notice of Allowance dated Apr. 18, 2016, pp. 5, for U.S. Appl. No. 14/318,012, filed Jun. 27, 2014.
Notice of Allowance dated Jul. 20, 2016, pp. 9, for U.S. Appl. No. 14/318,012, filed Jun. 27, 2014.
List of IBM Patents or Patent Applications Treated as Related dated Aug. 19, 2016, pp. 2.

* cited by examiner

MAINTENANCE OF A FABRIC PRIORITY DURING SYNCHRONOUS COPY OPERATIONS

CROSS-REFERENCE TO RELATED APPLICATIONS

This application is a continuation of application Ser. No. 14/318,012 filed on Jun. 27, 2014, which is incorporated herein by reference in its entirety.

BACKGROUND

1. Field

Embodiments are related to the maintenance of a fabric priority during synchronous copy operations.

2. Background

Fibre Channel is a switched communications protocol that allows communication among computing devices. Fibre Channel may be considered to be a channel and network hybrid, containing enough network features to provide the needed connectivity, distance and protocol multiplexing, and enough channel features to retain simplicity, repeatable performance and reliable delivery. Fibre Channel is capable of transmission of frames at rates extending from 1 Gbps (gigabits per second) to 16 Gbps or more. It is also able to transport commands and data according to existing protocols such as Internet protocol (IP), Small Computer System Interface (SCSI), High Performance Parallel Interface (HIPPI) and Intelligent Peripheral Interface (IPI), etc.

In certain situations, Fibre Channel is used to connect one or more devices, where the devices may include computing and storage devices. In the terminology of Fibre Channel, each of these devices is considered a node. One node may be connected directly to another, or may be interconnected, such as, via a Fibre Channel fabric. The fabric may be a single Fibre Channel switch, or a group of switches acting together. Multiple Fibre Channel switches may be combined into a single fabric.

Fibre Channel data is formatted into variable length frames. Each frame nay include a header and a data payload field. The integrated set of architectural standards that describe the formatting of Fibre Channel frames, data transfer mechanisms, and other aspects of the Fibre Channel architecture are being developed by the American National Standards Institute (ANSI).

"Fibre Channel Framing and Signaling-4 (FC-FS-4)", Rev. 0.50, published May 16, 2014 is a working draft proposed by ANSI, and describes the framing and signaling requirements for Fibre Channel links. "Fibre Channel Link Services (FC-LS-3)", Rev. 3.10, published Feb. 1, 2014 is a working draft proposed by ANSI, and describes the link services requirements for Fibre Channel.

FICON (Fibre Connection) is a Fibre Channel Protocol and may also be referred to by the formal names of FC-SB-3, FC-SB-4, or FC-SB-5. The protocol and functions specified by FC-SB-3 continues to be supported in FC-SB-4 and FC-SB-5, and further details of FC-SB-5 may be found in the publication, "FIBRE CHANNEL Single-Byte Command Code Sets Mapping Protocol-5 (FC-SB-5)", Rev. 2.0, published Mar. 26, 2013, by ANSI.

FICON is a Fibre Channel layer 4 protocol used to map certain types of channel to control unit cabling infrastructure and protocol onto standard Fibre Channel services and infrastructure, where a channel is a direct or a switched point-to-point connection between communicating devices. FICON uses two Fibre Channel exchanges for a channel to control unit connection—one for each direction. So while a Fibre Channel exchange is capable of carrying a command and response on a single exchange, the response to a FICON information unit (IU) is always on a different exchange from the IU to which it is a response. The two exchanges that implement a connection are called an exchange pair.

A storage controller is a computational device that controls access to one or more storage devices. Host computing systems may access data stored in the storage devices via the storage controller that may be coupled to the host via a Fabric. Thus the storage controller and hosts may operate in a Fibre Channel environment and may be coupled via a fabric. A storage controller, also referred to a primary storage controller may be coupled to a secondary storage controller to provide mirroring of data by copying data from the primary storage controller to the secondary storage controller.

SUMMARY OF THE PREFERRED EMBODIMENTS

Provided are a method, a system, and a computer program in which a primary storage controller receives a write command from a host, wherein Fibre Channel frames corresponding to the write command have a priority indicated by the host. The primary storage controller performs a synchronous copy operation to copy data written by the write command from the primary storage controller to a secondary storage controller, wherein Fibre Channel frames corresponding to the synchronous copy operation have an identical priority to the priority indicated by the host.

In certain embodiments, in a Fibre Connection (FICON) protocol implemented over Fibre Channel, all Fibre Channel frames of all related exchanges pairs that satisfy the write command are set to the identical priority corresponding to the priority indicated by the host.

In further embodiments, the write command is satisfied by: a first exchange pair to write the data to the primary storage controller; a second exchange pair to perform the synchronous copy operation; and a third exchange pair to respond from the primary storage controller to the host that the write command is satisfied, wherein Fibre Channel frames of the first exchange pair, the second exchange pair, and the third exchange pair all have the identical priority corresponding to the priority indicated by the host.

In additional embodiments, the priority of the write command is recorded in an input/output (I/O) task control block maintained in the primary storage controller. The recorded priority is copied to a copy services task control block to transfer the recorded priority for the synchronous copy operation.

In certain embodiments, the primary storage controller and the secondary storage controller control a plurality of storage devices, and a fabric comprising one of more Fibre Channel switches couples the primary storage controller, the secondary storage controller and the host.

In additional embodiments, the fabric transmits the Fibre Channel frames corresponding to the write command according to and with the priority indicated by the host to the primary storage controller. The fabric also transmits the Fibre Channel frames corresponding to the synchronous copy operation according to and with the identical priority indicated by the primary storage controller to the secondary storage controller.

In certain embodiments, the priority is indicated by programming a CS_CTL/Priority field in a frame headers corresponding to one Fibre Channel frame, and an exchange pair is comprised of an inbound exchange and an outbound exchange. Each of the inbound and the outbound exchange is comprised of one or more sequences, and each sequence is comprised of one or more Fibre Channel frames.

BRIEF DESCRIPTION OF THE DRAWINGS

Referring now to the drawings in which like reference numbers represent corresponding parts throughout.

Figure 1:
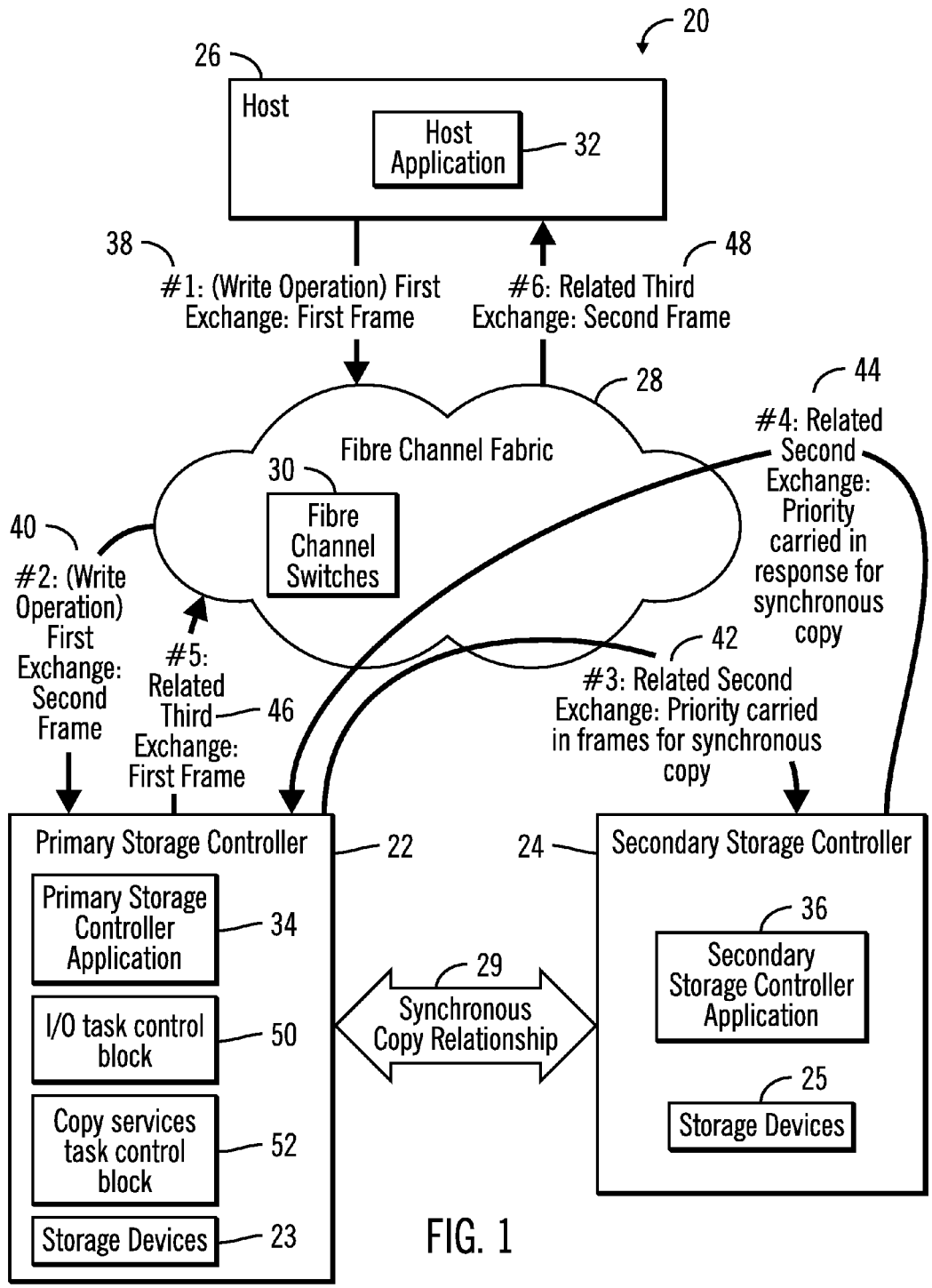
FIG. 1 illustrates a block diagram of a computing environment comprising a primary and a secondary storage controller coupled to a host via a fabric, in accordance with certain embodiments.
Figure 5:
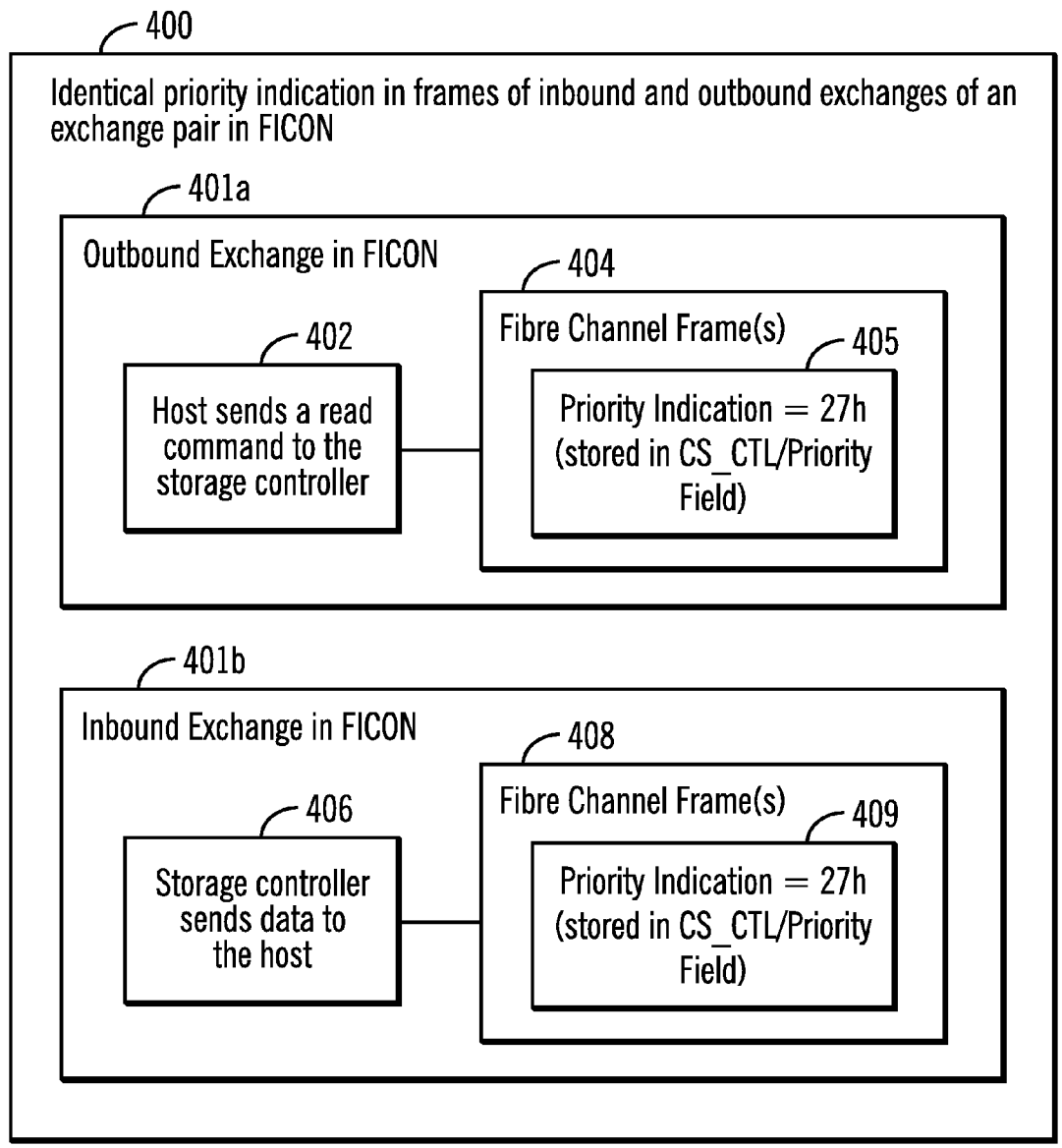
Figure 6:
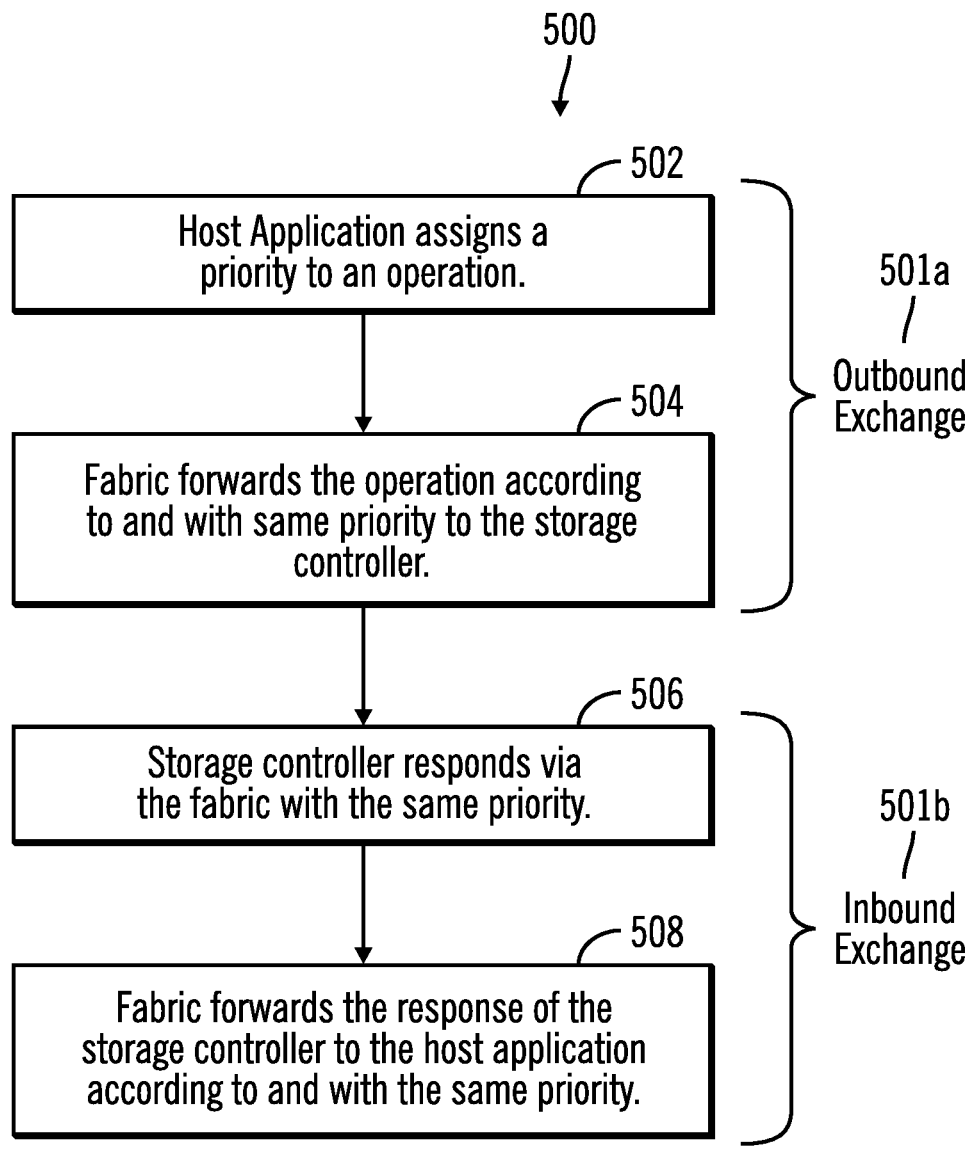
Figure 7:
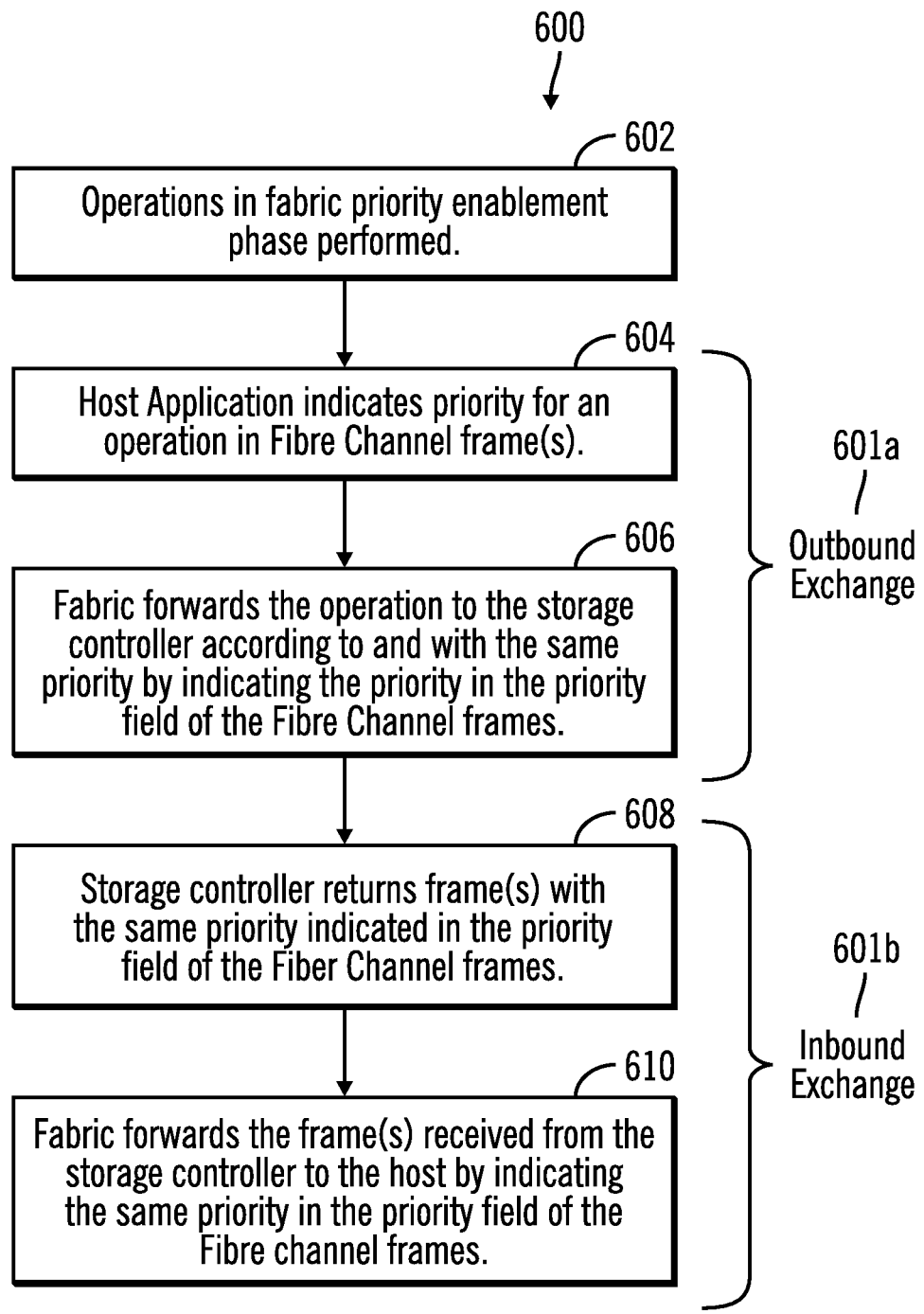
Figure 8:
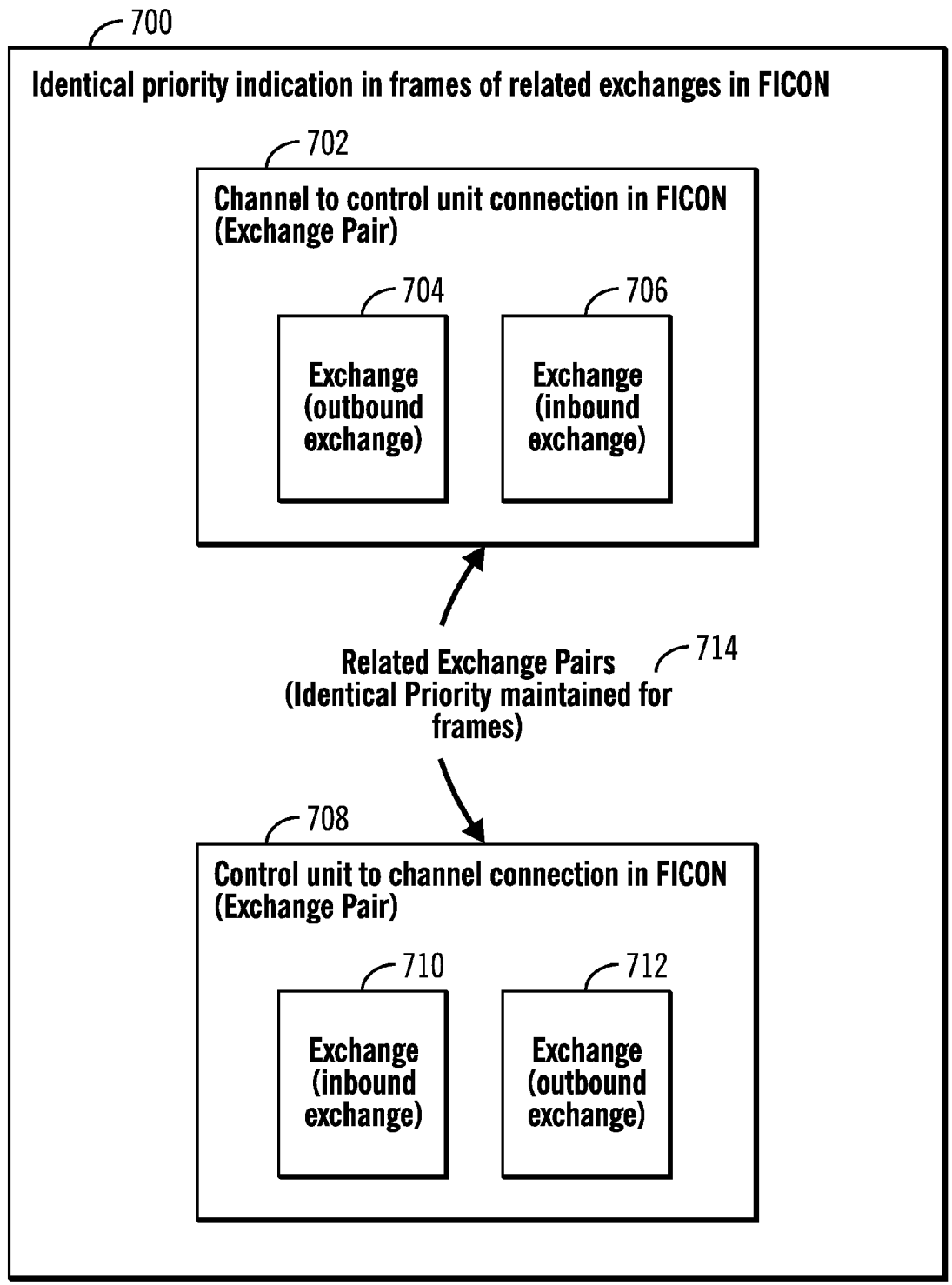
Figure 9:
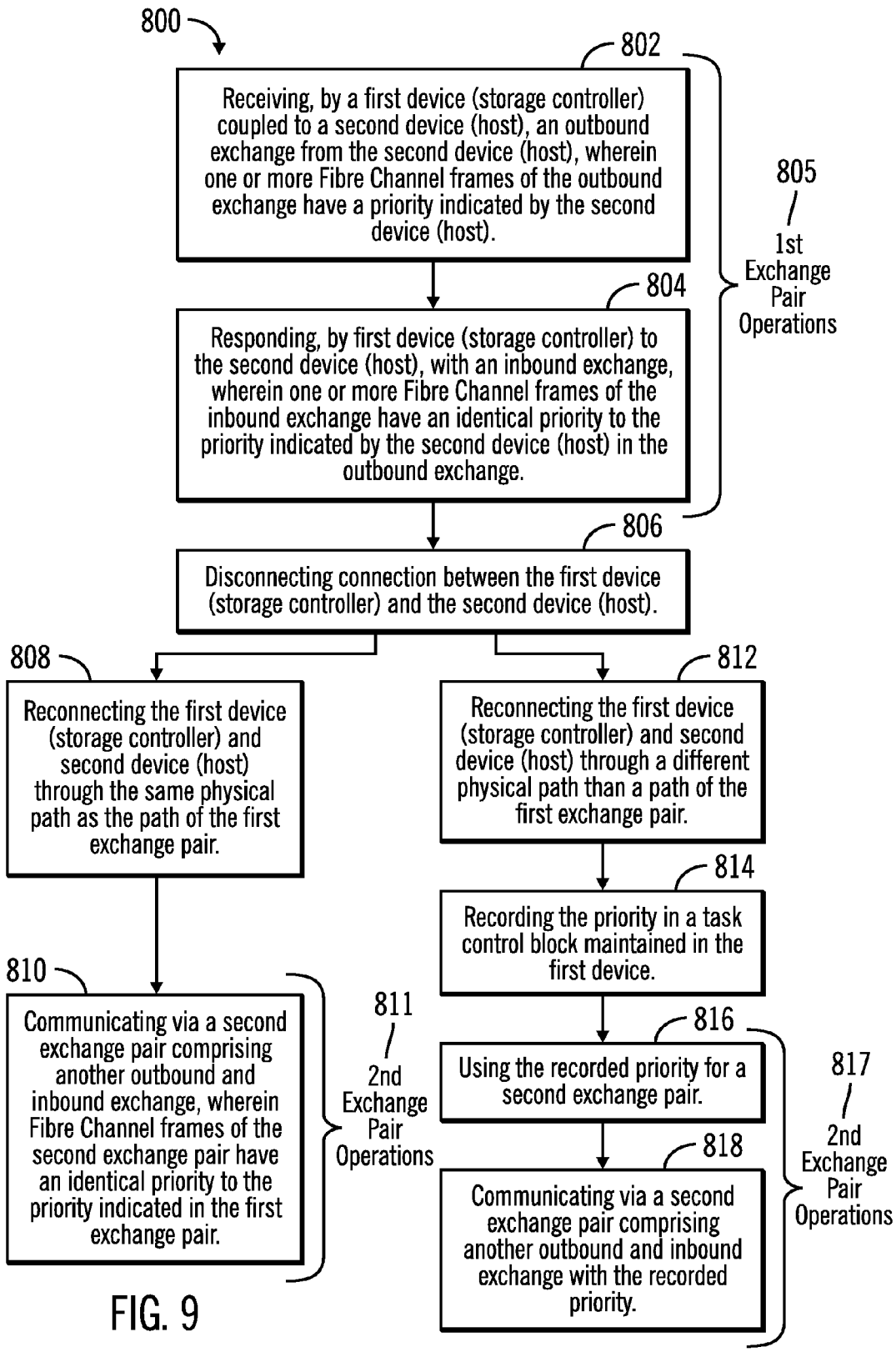
Figure 10:
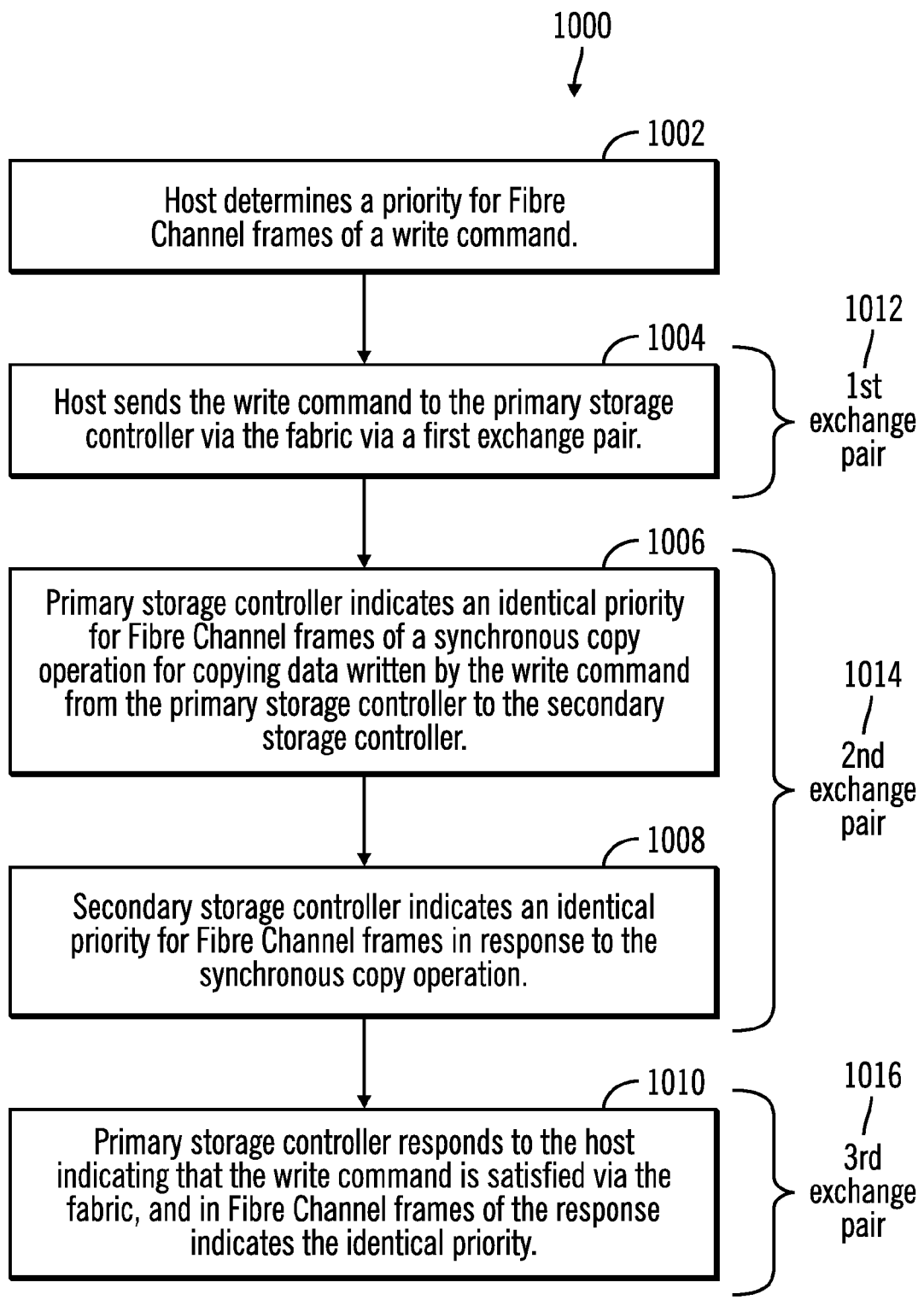
Figure 11:
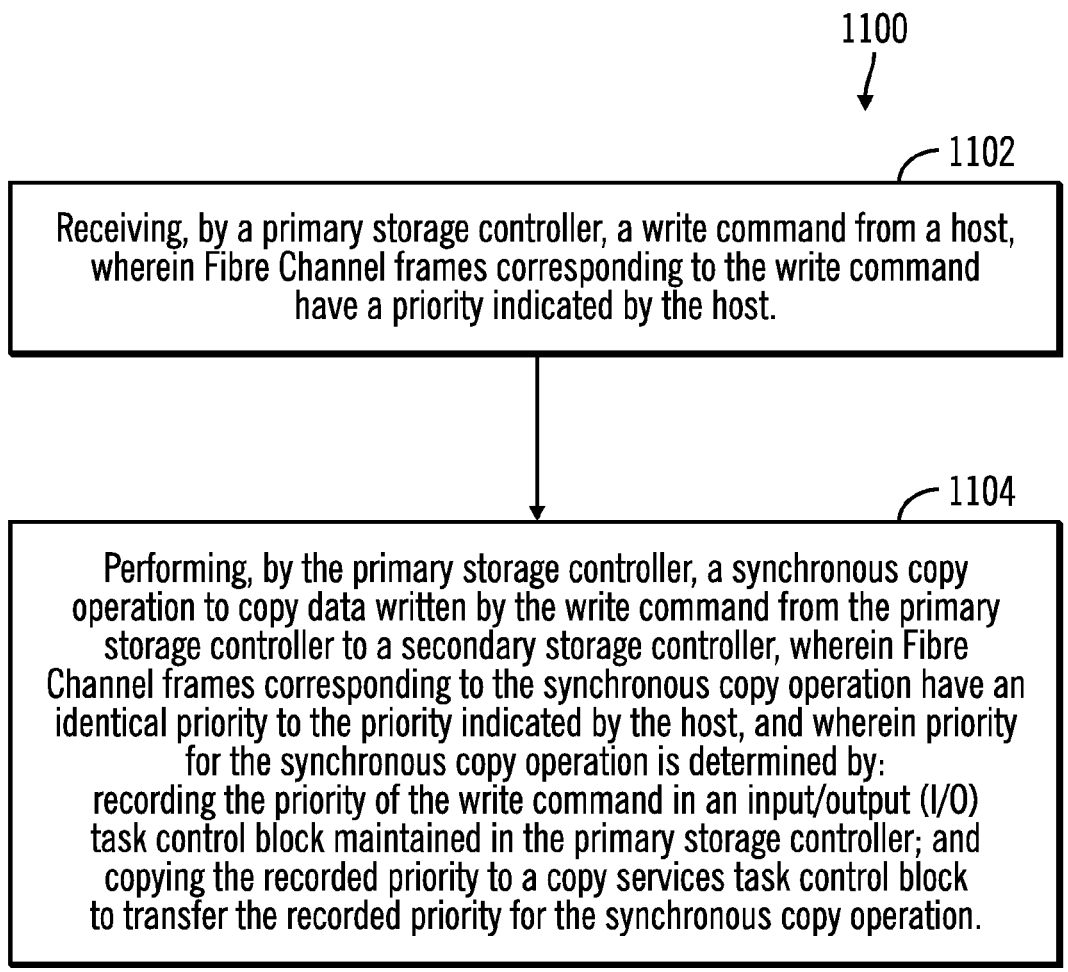
Figure 12:
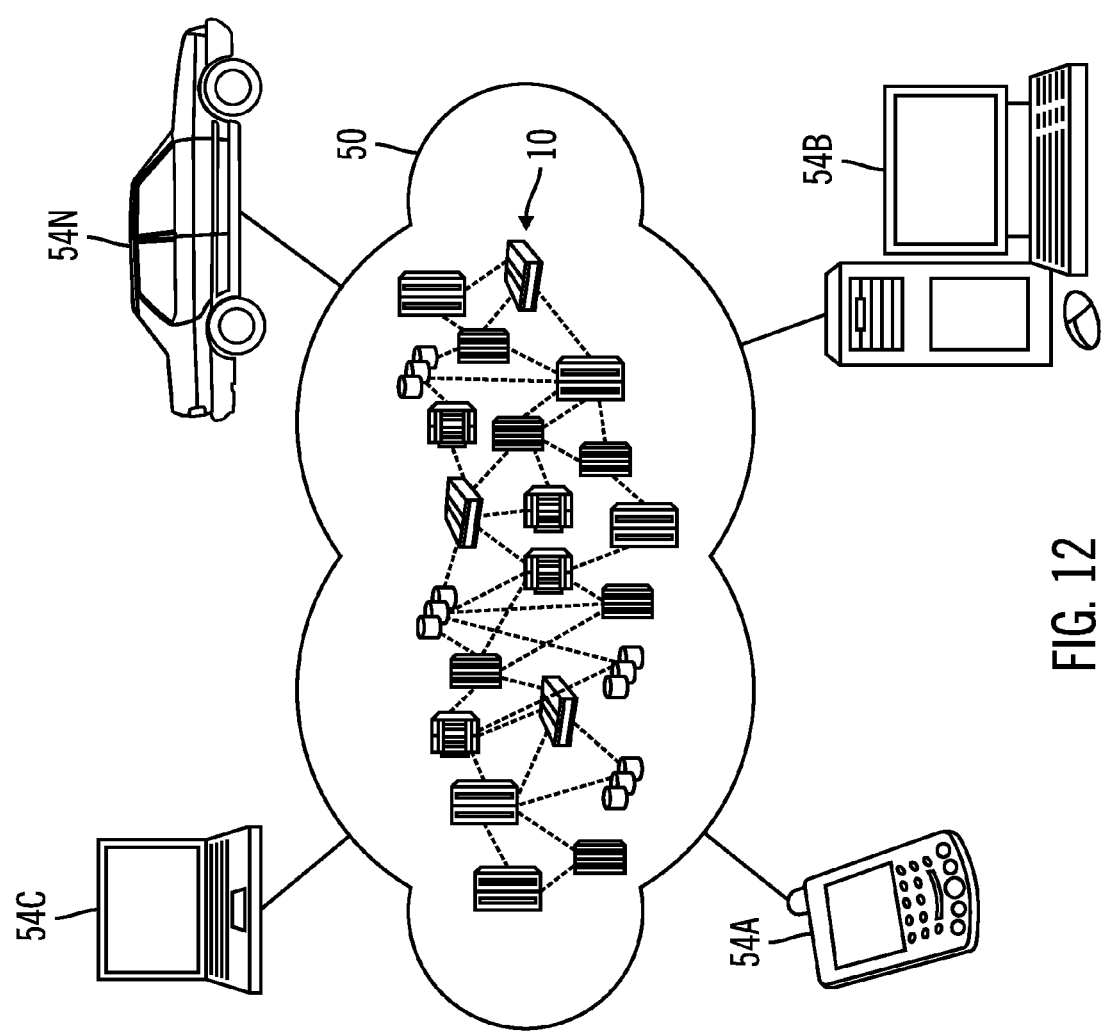
Figure 13:
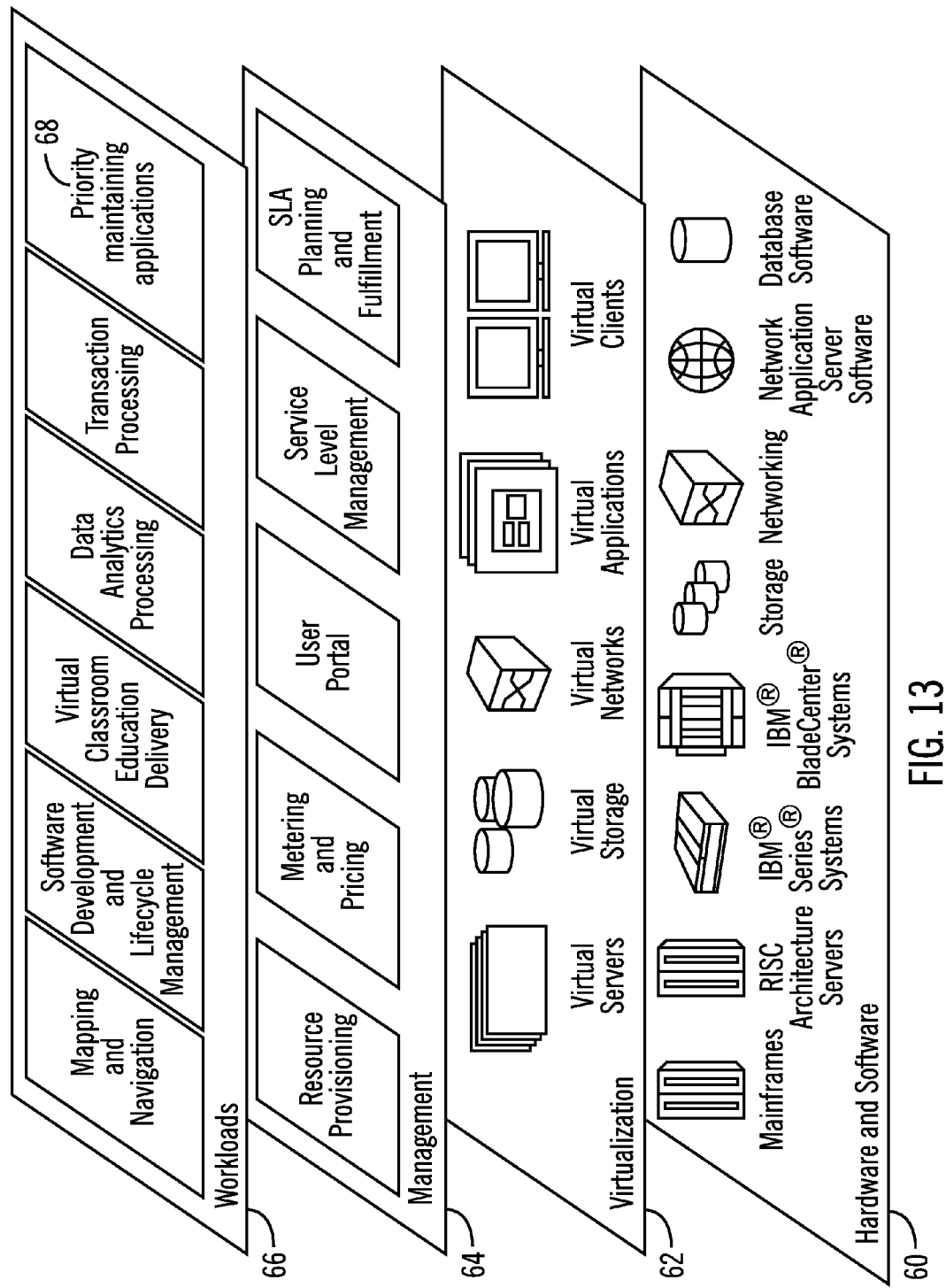
Figure 14:
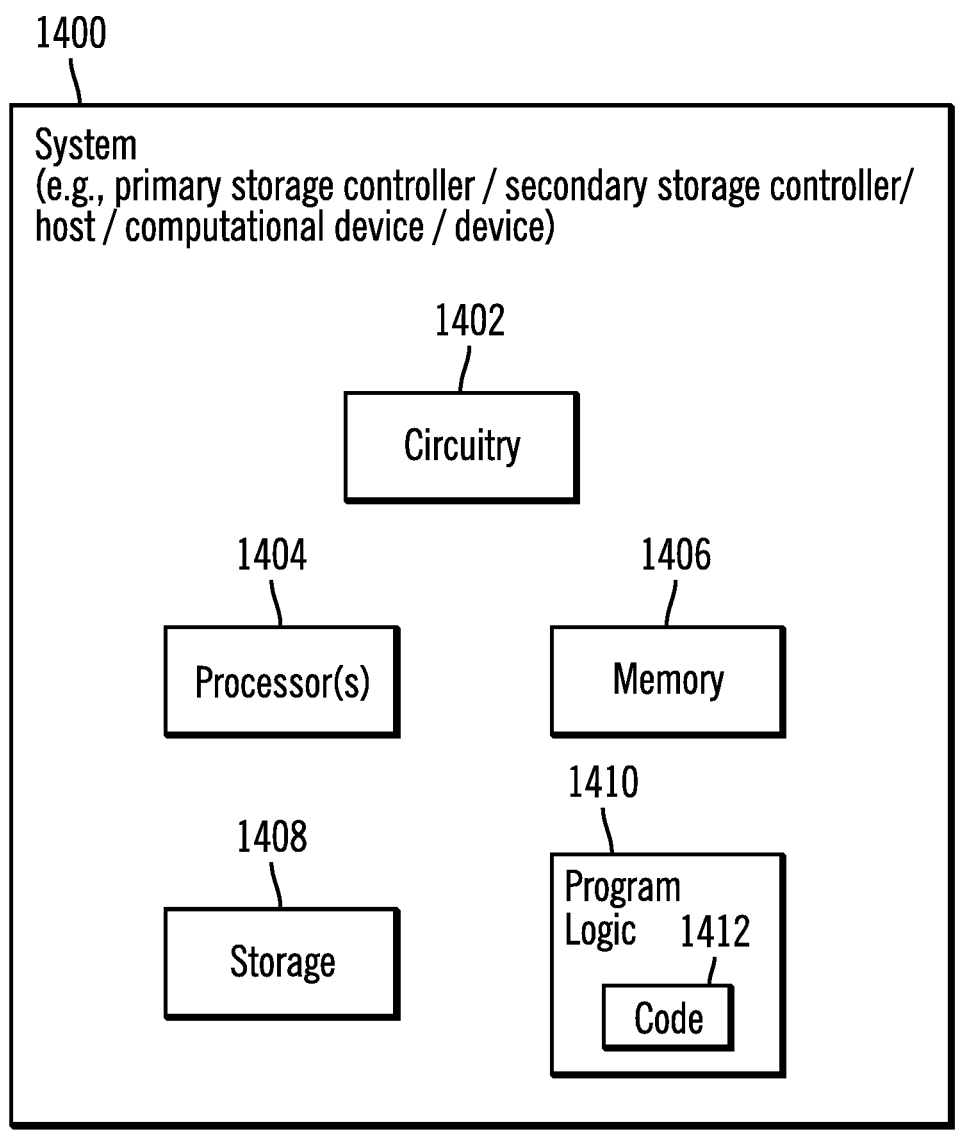

FICON data structures, in accordance with certain embodiments;

FIG. 5 illustrates a block diagram that shows an exemplary inbound and outbound exchange in FICON, in accordance with certain embodiments;

FIG. 6 illustrates a first flowchart that shows operations performed for maintaining priority within an exchange pair, in accordance with certain embodiments;

FIG. 7 illustrates a second flowchart that shows operations performed for maintaining priority within an exchange pair, in accordance with certain embodiments;

FIG. 8 illustrates a block diagram that shows how priority is maintained within related exchange pairs, in accordance with certain embodiments;

FIG. 9 illustrates a third flowchart that shows operations performed for maintaining priority during related exchanges, in accordance with certain embodiments;

FIG. 10 illustrates a fourth flowchart that shows operations performed for maintaining priority during synchronous copy from a primary to a secondary storage controller, in accordance with certain embodiments;

FIG. 11 illustrates a fifth flowchart that shows operations performed for maintaining priority during synchronous copy from a primary to a secondary storage controller, in accordance with certain embodiments;

FIG. 12 illustrates a block diagram of a cloud computing environment, in accordance with certain embodiments;

FIG. 13 illustrates a block diagram of further details of the cloud computing environment of FIG. 10, in accordance with certain embodiments; and FIG. 14 illustrates a block diagram of a computational system that shows certain elements that may be included in the primary storage controller, the secondary storage controller, or the host shown in FIG. 1, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Certain embodiments allow priority of Fibre Channel frames to be maintained in a synchronous copy environment. In the synchronous copy environment, write commands from a host to a primary storage controller causes the data written by the write command to be synchronously copied from the primary to the secondary storage controller. In certain embodiments, the priority indicated by the host for the write command is carried over for the synchronous copy operation.

Exemplary Embodiments

FIG. 1 illustrates a block diagram of a computing environment 20 comprising a primary storage controller 22 and a secondary storage controller 24 coupled to a host 26 via a Fibre Channel fabric 28, in accordance with certain embodiments. The primary storage controller 22 and the secondary storage controller 24 are in a synchronous copy relationship (reference numeral 29) to each other. For example, in certain embodiments, the primary storage controller 22 and the secondary storage controller 24 may be in a peer-to-peer synchronous remote copy relationship. In synchronous copy relationship if the host 26 sends a write request to the primary storage controller 22, the data stored by the primary storage controller 22 in exemplary storage devices 23 as a result of the write request is copied to storage devices 25 controlled by the secondary storage controller 24. As long as the data is not completely copied over to storage devices 25 controlled by the secondary storage controller 24, the write request sent by the host 26 does not complete. Therefore, in synchronous copy there may be a waiting time for completion of host write requests. In alternative embodiments, if the primary storage controller 22 is in an asynchronous copy relationship to the secondary storage controller 24, the write request from the host 26 completes after data has been written to the storage devices 23 of the primary storage controller, even if the data has not been completely copied over to the storage devices 25 of the secondary storage controller.

In synchronous copy the write request from the host 26 has to wait while the synchronous copy is being completed. As a result, it may be desirable to ensure that priority for exchanges in the FICON protocol that use Fibre Channel frames all have the priority indicated in the write request by the host 26. Other protocols may also be used instead of FICON, and the priority of Fibre Channel frames are maintained such embodiments. Otherwise, a high priority write request indicated by the host 26 may wait for a longer period of time, should the exchanges of synchronous copy be performed without any prioritization or with a lower priority.

The primary storage controller 22, the secondary storage controller 24 and the host 26 may comprise any suitable computational device including those presently known in the art, such as, a personal computer, a workstation, a server, a mainframe, a hand held computer, a palm top computer, a telephony device, a network appliance, a blade computer, a processing device, etc. The primary storage controller 22, the secondary storage controller 24, and the host 104 may be elements in any suitable network, such as, a storage area network, a wide area network, the Internet, an intranet. In certain embodiments, primary storage controller 22, the secondary storage controller 24, and the host 104 may be elements in a cloud computing environment.

In certain embodiments, the primary storage controller 22 and the secondary storage controller 24 are coupled to each other and to the host 104 via a Fibre Channel fabric 28, where the Fibre Channel fabric 28 is also referred to as a fabric. The fabric 28 is comprised of one or more Fibre Channel switches 30. A host application 32 executes in the host 104 and storage controller applications 34, 36 (referred to as primary storage controller application 34 and secondary storage controller application 36) execute in the storage controllers 22, 24, where the host application 32 and the storage controller applications 34, 36 may be implemented in software, hardware, firmware or any combination thereof.

The primary storage controller 22 controls access to one or more storage devices 23 that are coupled to the primary storage controller 22. The secondary storage controller 24 controls access to one or more storage devices 25 that are coupled to the secondary storage controller 24. While not shown in FIG. 1, in alternative embodiments, the coupling of the storage devices 23, 25 to the storage controllers 22, 24 may also be via the fabric 28. In certain embodiments, the storage devices 23, 25 may be external to the storage controller 22, 24.

In certain embodiments, in accordance with the FICON protocol, the host 26, the fabric 28, the primary storage controller 22, and the secondary storage controller 24 may transmit or receive Fibre Channel frames among themselves via exchanges 38, 40, 42, 44, 46, 48 as shown in FIG. 1. Other protocols that use Fibre Channel frames may also be used in alternative embodiments.

In certain embodiments, the host 104 indicates a priority in Fibre Channel frames on a first exchange related to write requests intended for the primary storage controller 22 that are sent via the fabric 28 (reference numerals 38, 40). The primary storage controller 22 starts writing the data corresponding to the write request on one or more storage devices 23 and also starts performing a synchronous copy of the data to the secondary storage controller 24 via a second exchange that is related to the first exchange (reference numerals 42, 44). The primary and secondary storage controllers 22, 24 maintain the same priority for the second exchange as the priority indicated in the first exchange. Once the second exchange is over, the primary storage controller 22 communicates to the host 26 via a third exchange to indicate that the write command has been satisfied (reference numerals 46, 48). The primary storage controller 22 maintains the same priority for the third exchange as the priority indicated in the first exchange and carried over to the second exchange.

In certain embodiments, for write operations that require synchronous remote copy operations to complete before the write command completion, the same fabric priority is used in related frames and/or exchanges used to transfer the data to the secondary storage controller 24 from the primary storage controller 22. For performing this, priority is transferred from an input/output (I/O) task control block 50 to a copy services task control block 52 on a central processing complex of the primary storage controller 22. When a copy services operation chooses a path for the replication (i.e., remote copy) operation, the recorded priority value is transferred to the host adapter or host bus adapter that is used for the copy operation. The I/O issued to the secondary storage controller 24 includes this priority in associated frames and/or exchanges, thus maintaining consistency in the priority of the initial write operation that is pending during the synchronous remote copy.

Therefore FIG. 1 illustrates certain embodiments, in which priority indicated by the host 26 for a write request to a primary storage controller 22 is carried over for exchanges and/or frames related to a synchronous copy to a secondary storage controller 24.

Figure 2:
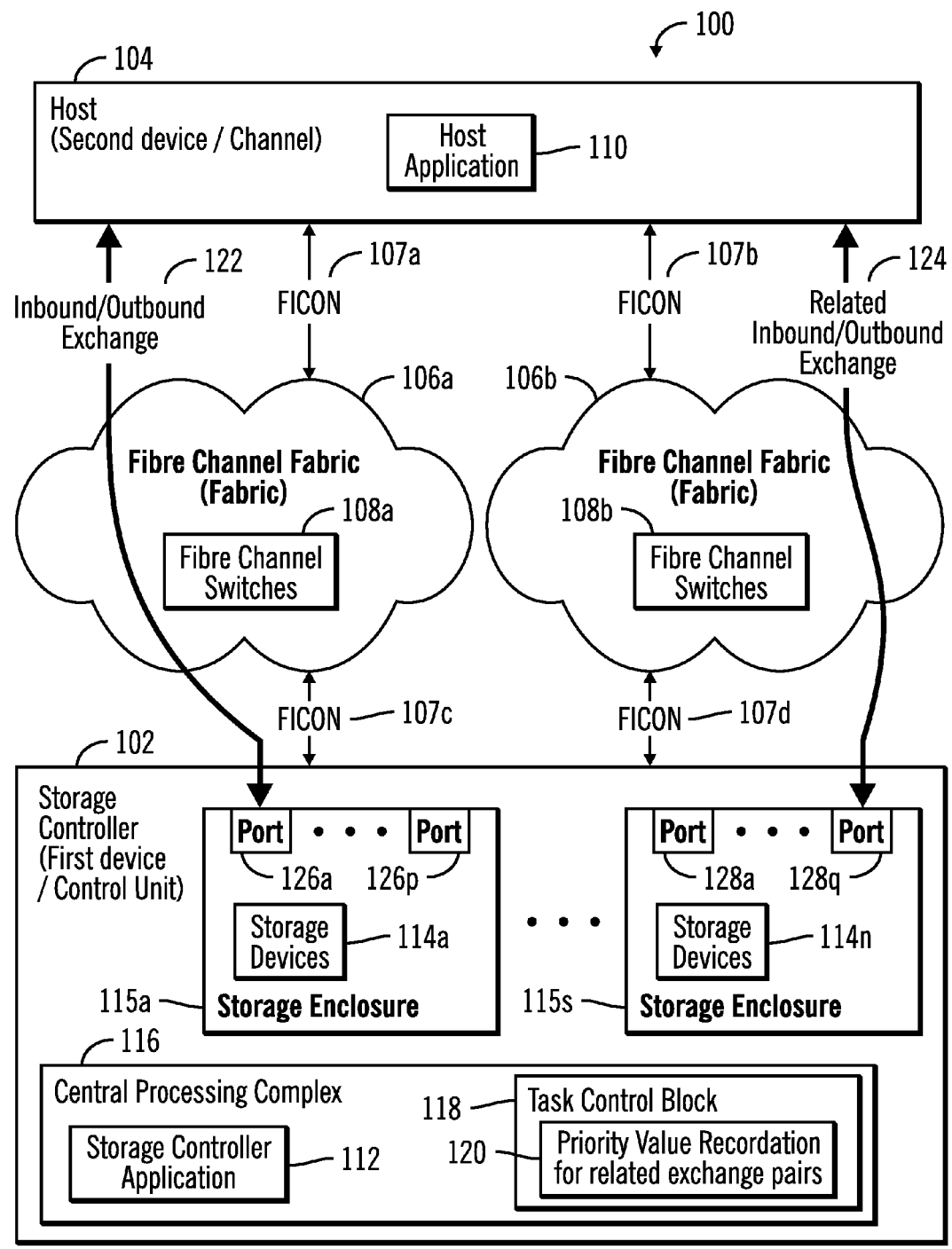
FIG. 2 illustrates a block diagram of a computing environment comprising a storage controller coupled to a host via a fabric by using the FICON protocol, in accordance with certain embodiments.

While FIG. 1 is directed towards maintaining priority during synchronous copy operations, FIG. 2 is directed towards maintaining priority during related exchanges specifically for the FICON protocol. It may be noted that the exchange for synchronous copy 42, 44 is related to the I/O exchange 38, 40 for the write operation in FIG. 1. Also in FIG. 1, the third exchange 46, 48 is related to the exchange for the synchronous copy 42, 44.

FIG. 2 illustrates a block diagram of a computing environment 100 comprising a storage controller 102 coupled to a host 104 via one or more Fibre Channel fabrics 106a, 106b, in accordance with certain embodiments. In certain embodiments communication takes place by using the FICON protocol (shown via reference numerals 107a, 107b, 107c, 107d).

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via one or more Fibre Channel fabrics 106a, 106b, where the Fibre Channel fabric is also referred to as a fabric. The fabrics 106a, 106b are comprised of one or more Fibre Channel switches 108a, 108b. A host application 110 executes in the host 104 and a storage controller application 112 executes in the storage controller 102 within a central processing complex 116, where the host application 110 and the storage controller application 112 may be implemented in software, hardware, firmware or any combination thereof. The communication between the host 104 and the storage controller 102 uses the FICON protocol that is implemented over Fibre Channel and uses Fibre Channel frames.

The storage controller 102 controls access to one or more storage devices 114a, 114n that are placed within a plurality of storage enclosures 115a . . . 115s. The controlling of access to the storage devices 114a . . . 114n may be performed via the central processing complex 116 that executes in the storage controller application 112. The central processing complex 116 may also include data structures for a task control block (TCB) 118 that stores in a data structure 120, the priority value for related exchange pairs.

In certain embodiments, the host 104, the fabrics 106a, 106b, and the storage controller 102 may transmit or receive Fibre Channel frames via exchange pairs 122, 124 in accordance with the FICON protocol as shown in FIG. 2. Each exchange pair 122, 124 may be comprised of an inbound and an outbound exchange, and exchange pairs 122 and 124 are shown as related exchange pairs in FIG. 2.

In certain embodiments, the storage enclosures 115a, . . . 115s may have a plurality of ports 126a . . . 126p, 128a . . . 128q. In certain embodiments, different exchange pairs may be used for communicating via different ports or different fabrics. For example, exchange pair 122 is used over port 126a and fabric 106a, and exchange pair 124 is used over port 128q and fabric 106b.

In certain embodiments, within an exchange pair, the host 104 indicates a priority in Fibre Channel frames on commands intended for the storage controller 102 that are sent via the fabric 106a in an outbound exchange. The storage controller 102 responds to the command from the host 104 by sending Fibre Channel frames via the fabric 106a with the same priority as the priority indicated by the host 104 in an inbound exchange.

In certain embodiments, the storage controller 102 may disconnect from the host 104 after communicating via a first exchange pair 122. After disconnection, the storage controller 102 may retrieve data, and send the data via a second exchange pair 124. In certain embodiments, the priority of the first exchange pair 122 is carried over the second exchange pair 124.

It may be noted that such disconnections, etc., shown in FIG. 2, may also take place in other embodiments such as in the synchronous remote copy environment 20 shown in FIG. 1

Figure 3:
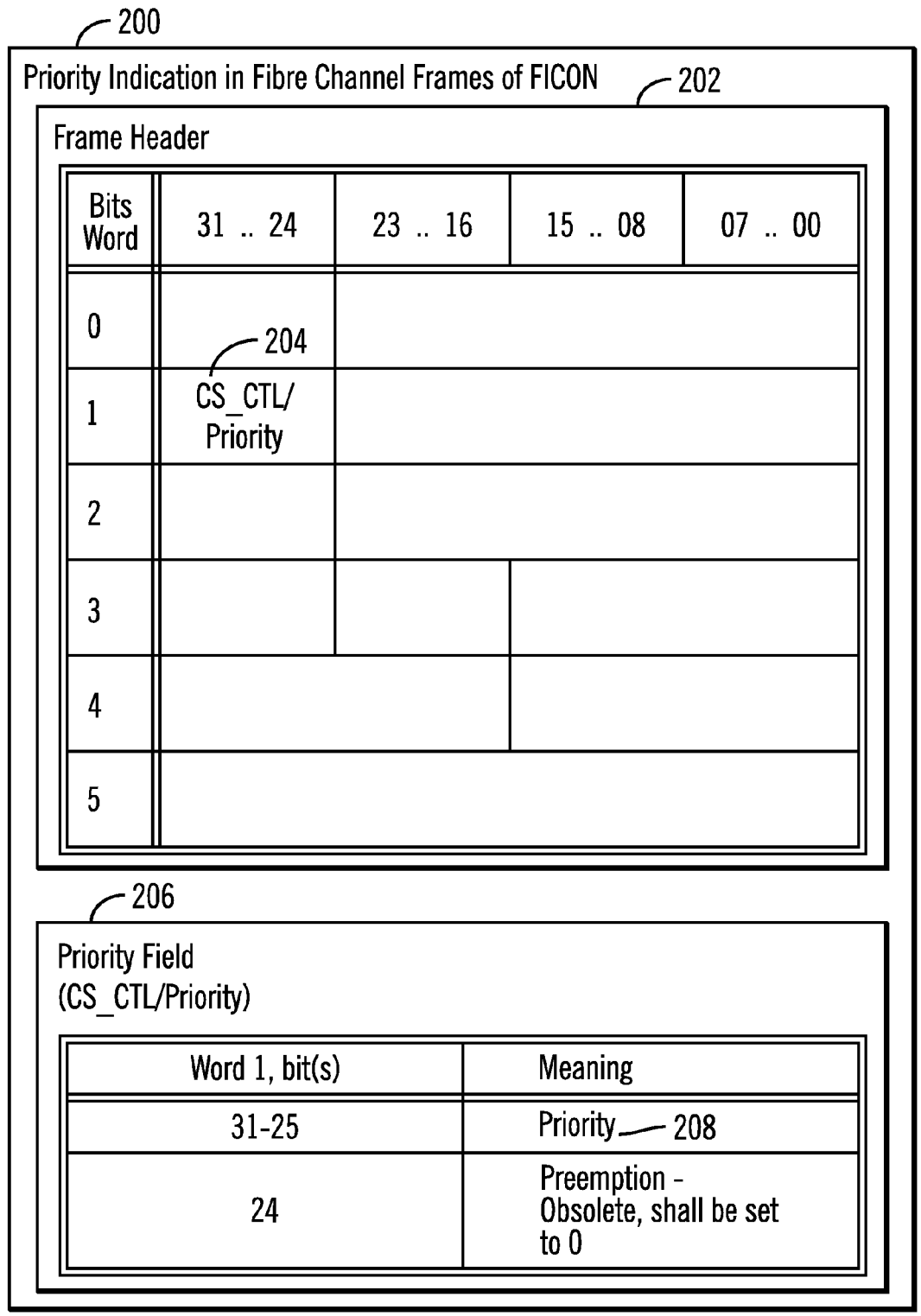
FIG. 3 illustrates a block diagram that how priority is indicated in a Fibre Channel frame of the FICON protocol, in accordance with certain embodiments.

FIG. 3 illustrates a block diagram 200 that how priority is indicated in Fibre Channel frames of FICON, in accordance with certain embodiments.

FC-FS-4 provides a mechanism to indicate a priority in the header 202 of a Fibre Channel frame. The CS_CTL/Priority field 204 is used to indicate the priority of the Fibre Channel frame. In an exemplary CS_CTL/Priority field 206 bits 25-31 indicate the priority as shown via reference numeral 208. A value of 0000000b bits 31-25 indicates that no Priority has been assigned to the frame. The remaining values indicates, in ascending order, the relative priority of the frame (e.g., a Priority of 23h is considered to have a lower priority than a Priority of 57h). Higher priority frames (i.e., frames with a higher indicated priority) receive preferential treatment for processing, resources, transmission, etc. in comparison to lower priority frames (i.e., frames with a lower indicated priority).

Certain embodiments use Fiber Channel storage area network (SAN) architecture to provide mechanisms for a host application or operating system to specify a fabric priority to be used to manage input/output (I/O) requests through the SAN. The Fibre Channel standards allow for specification of an operation priority in each frame sent for the operation. Fibre channel switches 108 may use this information to provide a guaranteed (or a higher quality of service) for higher priority operations.

In certain embodiments the storage controller 102 is set to the same priority that is received in an I/O operation from a host 104, in all frames sent from the storage controller 102 that are related to the operation. This includes frames in the same exchange pair or in related exchange pairs. The support and use of fabric priority in Fibre Channel frames in FICON is negotiated to avoid disruption to existing installations.

Figure 4:
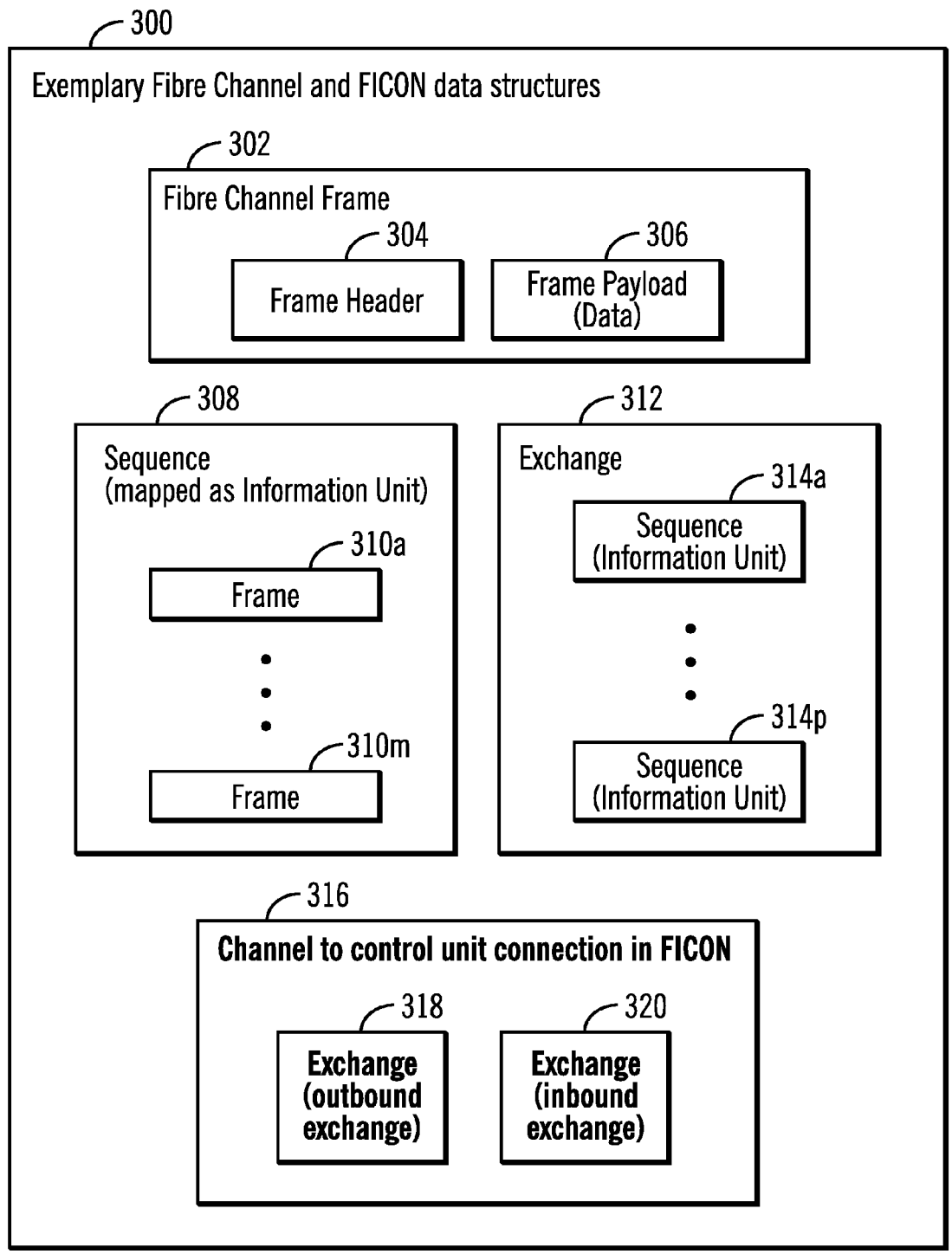
FIG. 4 illustrates a block diagram that shows exemplary Fibre Channel.

FIG. 4 illustrates a block diagram that shows exemplary Fibre Channel and FICON data structures 300, in accordance with certain embodiments. A Fibre Channel frame 302 is comprised of a frame header 304 and a frame payload 306, where the frame header 304 may include control information and the frame payload 306 may include data.

A sequence 308 (mapped as an Information Unit in FICON) is comprised of one or more frames 310a . . . 310m, and an exchange 312 is comprised of a plurality of sequences 314a . . . 314p. A channel to control unit connection in FICON 316 is comprised of two exchanges (referred to as an exchange pair) comprising an outbound exchange 318 and an inbound exchange 320.

FIG. 5 illustrates a block diagram 400 that shows identical priority indication in Fibre Channel frames of an exemplary exchange pair in FICON, in accordance with certain embodiments. In an outbound exchange 401a, a host sends a read command to a storage controller (at block 402) where the read command is sent via Fibre Channel frame(s) 404 that include the priority indication of 27h (reference numeral 405). The storage controller in response sends via an inbound exchange 401b, data to the host (at block 406), where the data is sent via Fibre Channel frame(s) 408 that include the priority indication of 27h (reference numeral 409), i.e., the priority indication in the inbound exchange 401b from the storage controller is the same as the priority indication in the outbound exchange 401a from the host. Therefore, in certain embodiments, the priority indication (e.g., 27h) in the inbound and outbound exchanges of an exchange pair are the same.

FIG. 6 illustrates a first flowchart 500 that shows operations performed for maintaining priority within an exchange pair comprising an outbound exchange 501a and an inbound exchange 501b, in accordance with certain embodiments. While the operations shown in FIG. 6 have been described with reference to elements shown in FIG. 2, the operations shown in FIG. 6 may in other embodiments be performed via elements shown in FIG. 1.

Control starts at block 502 in which within an outbound exchange 501a, a host application 110 assigns a priority to an operation. The fabric 106 forwards (at block 504) the operations according to and with the same priority to the storage controller 102 within the outbound exchange 501a. The storage controller 102 responds via the fabric 106 with the same priority (at block 506) within an inbound exchange 501b, and the fabric 106 then forwards (at block 508) the response of the storage controller 102 to the host application 110 according to and with the same priority within the inbound exchange 501b. The priority is maintained within the exchange pair comprising the outbound exchange and the inbound exchange by programming the CS_CTL/Priority field of the frame headers with the priority initially assigned by the host application 110 at block 502.

FIG. 7 illustrates a second flowchart 600 that shows operations performed for maintaining priority within an exchange pair comprising an outbound exchange 601a, comprising operations 604, 606, and an in inbound exchange 601b comprising operations 608, 610, in accordance with certain embodiments. While the operations shown in FIG. 7 have been described with reference to elements shown in FIG. 2, the operations shown in FIG. 7 may in other embodiments be performed via elements shown in FIG. 1.

In FIG. 7, in a first phase a fabric priority enablement is performed (at block 602) In fabric priority enablement, Fabric Login and N Port login service parameters are used to negotiate use of priority in frames sent and received (See FC-LS-3 rev 3). For N Port Login, the host 104 sets the Priority bit (word 0, bit 23) to one to indicate tolerance for non-zero values in the Priority field in the frame header when CS_CTL/Priority Enable bit (F_CTL bit 17) is set to one. The target/control unit indicates tolerance for non-zero values in the Priority field by setting this bit to one in the LS_ACC.

For Fabric Login, the priority bit indicates support for a priority function. When an Nx_Port performs Login with a fabric (FLOGI), it requests support for use of the Priority field by setting the Priority bit (word 0, bit 23) to one. If Priority is set to one in both the FLOGI and the FLOGI LS_ACC, then both the Nx_Port and fabric 106 have agreed that priority is available for use.

The storage device may indicate tolerance of non-zero values in Priority field (with F_CTL bit 17=1) by always setting the Priority service parameter bit to 1 for both class 2 and class 3 service parameters in a PLOGI ACC. The storage device may also indicate support for the fabric priority function by setting the Priority service parameter bit in the FLOGI service parameters for class 2 and 3. The received values of the Priority service parameter bits for class 2 and 3 may be recorded from the FLOGI LS_ACC and each PLOGI. If the Priority bit is set in both the FLOGI_LS_ACC and a PLOGI, then the priority function is enabled for use with that remote N_Port (the port which is now logged in).

As a result of the fabric priority enablement operations, it is determined (at block 602) that the host 102, the fabric 106 and the storage controller 102 all support the indication of priority in Fibre Channel frames. The priority ranges supported are also determined so that suitable common priority ranges are used. Control proceeds to block 604 in which the host application 110 indicates a priority for an operation in Fibre Channel frames in the outbound exchange 601a. The fabric 106 forwards (at block 606 in the outbound exchange 601a) the operation to the storage controller 102 according to and with the same priority by indicating the priority in the priority field of the Fibre Channel frames.

The storage controller 106 returns frame(s) corresponding in the inbound exchange 601b with the same priority indicated in the priority field of the Fiber Channel frames (at block 608 in the inbound exchange 601b). The fabric 106 forwards the frames(s) received from the storage controller 102 to the host 104 by indicating the same priority in the priority field of the Fibre Channel frames (at block 610 in the inbound exchange 601b) to ensure that the same priority is maintained throughout the exchange pair 601a, 601b.

FIG. 8 illustrates a block diagram 700 that shows identical priority indication in frames of related exchanges in FICON, in accordance with certain embodiments. While the operations shown in FIG. 8 have been described with reference to elements shown in FIG. 2, the operations shown in FIG. 8 may in other embodiments be performed via elements shown in FIG. 1.

Certain embodiments allow priority of frames to be maintained within a FICON exchange pair 702 (indicated as a channel to control unit connection 702). For example, in certain embodiments a host 104 may in an outbound exchange 704 send a Fibre channel frame to a fabric 108a and indicate a priority for the Fibre Channel frame in a priority field in the header of the Fibre Channel frame. The fabric 108a which supports priority indications for Fibre Channel frames may forward the Fibre Channel frame to a storage controller 102. As a result, the storage controller 102 receives the priority indicated by the host 104. While responding to the host 104 via the fabric in an inbound exchange 706, the storage controller 102 responds with frames that have the same priority indicated originally by the host 104. As a result, the host 104 receives the response of the storage controller 102 with the same priority as the priority indicated by the host 104.

In some input/output (I/O) protocols, such FICON, there are multiple related exchanges 702, 708 used to complete an operation. Certain embodiments ensure that Fibre Channel frames sent through a fabric on these related exchanges 702, 708 maintain the same priority as the frames used on the exchange that initiated the operation.

The FICON protocol uses exchange pairs comprising an outbound and an inbound exchange. The outbound exchange 704 is used by a channel (e.g. a host) to initiate an I/O operation with a control unit or target device. The target device opens a new inbound exchange 706 to transmit any responses to the channel that initiated the operation. In certain embodiments, if a priority value is recorded for the operation (the Fibre Channel frame that started the operation on the outbound exchange 704 has the Priority set), then any frame sent on the related inbound exchange 706 uses the recorded priority value.

When FICON operations may take longer than a normal time to execute (some number of microseconds or milliseconds, e.g., when data is not available in cache and has to be fetched from secondary storage), in certain embodiments the operation is disconnected from the channel (intermediate status is provided and the inbound and outbound exchanges 704, 706 are closed). Later when the operation is able to complete, a reconnection to the channel (e.g., the host) is performed by the target device (e.g., the storage controller 102) by opening a new inbound exchange 710 to complete the I/O operation. The same priority needs is used on the reconnected operation as was used for the initial operation.

In certain embodiments, this reconnection may occur through a different physical path that the one that started the initial operation. The chosen path may be operated by a separate port 128q than the initial port 126a. The ports 126a, 128q communicate to the central processing complex 116 for executing the operations. For the case of a disconnected operation, the first port 126a may communicate the recorded priority value to the central processing complex 116 where the central processing complex 116 records the priority value 120 for the operation in a Task Control Block 118. When the central processing complex 116 is ready to complete the operation, a reconnection path is chosen and the recorded priority value is communicated to the port 128q chosen for reconnection. The second port 128q records the priority value with the exchange pair 708 that is used to complete the operation and uses this priority value in any frames sent on the new inbound exchange 710 created for reconnection. The outbound exchange 712 in the exchange pair 708 also uses the same priority value.

Therefore FIG. 8 illustrates certain embodiments in which related exchange pairs 702, 708 maintain identical priority values for Fibre Channel frames (shown via reference numeral 714).

FIG. 9 illustrates a third flowchart 800 that shows operations performed for maintaining priority within related exchange pairs when reconnection is via the same or a different physical path, in accordance with certain embodiments. While the operations shown in FIG. 9 have been described with reference to elements shown in FIG. 2, the operations shown in FIG. 9 may in other embodiments be performed via elements shown in FIG. 1.

Control starts at block 802 in which a first device 102 (storage controller 102) coupled to a second device 104 (host 104) receives an outbound exchange from the second device 104 (host 104), wherein one or more Fibre Channel frames of the outbound exchange have a priority indicated by the second device 104 (host 104). The first device 102 (storage controller 102) responds (at block 804) to the second device 104 (host 104) with an inbound exchange, wherein one or more Fibre Channel frames of the inbound exchange have an identical priority to the priority indicated by the second device 104 (host 104) in the outbound exchange.

In additional embodiments, the inbound exchange and the outbound exchange comprise a first exchange pair 805. A connection between the first device 102 (storage controller 102) and the second device 104 (host 104) is disconnected (at block 806). Subsequent to disconnecting, the first device 102 (storage controller 102) and second device 104 (host 104) are reconnected at block 806 (either via the same physical path as the physical path of the first exchange pair as shown via reference numeral 808, or via a different physical path as shown via the reference numeral 812).

From block 808 control flows to block 810, in which a communication is performed via a second exchange pair 811 comprising another outbound and inbound exchange, wherein Fibre Channel frames of the second exchange pair have an identical priority to the priority indicated in the first exchange pair.

In further embodiments, the reconnecting occurs through a different physical path than a path of the first exchange pair (as shown via reference numeral 812). The priority is recorded in a task control block maintained in the first device (at block 614), and the recorded priority is used for the second exchange pair 817 (at block 818).

FIG. 10 illustrates a fourth flowchart 100 that shows operations performed for maintaining priority during synchronous copy from a primary to a secondary storage controller, in accordance with certain embodiments. The operations shown in FIG. 10 may best be understood with reference to elements described in FIG. 1.

Control starts at block 1002 in which a host 26 determines a priority for Fibre Channel frames of a write command. The fabric priority enablement phase to determine whether the fabric 28 supports priority for Fibre Channel frames for the host 26 and the primary and secondary storage controllers 22, 24 is performed prior to determining the priority, and the priority is determined only if priority is supported by the fabric 28.

Control proceeds to block 1004 in which the host 26 sends the write command to the primary storage controller 22 via the fabric 28 via a first exchange pair (the sending of the write command via the outbound exchange is shown in FIG. 1 via reference numerals 38, 40).

Control proceeds to block 1006 in which the primary storage controller 22 indicates an identical priority for Fibre Channel frames of a synchronous copy operation for copying data written by the write command from the primary storage controller 22 to the secondary storage controller 24 (also shown in FIG. 1 via reference numeral 42).

The secondary storage controller 24 indicates (at block 1008) an identical priority for Fibre Channel frames in response to the synchronous copy operation (also shown in FIG. 1 via reference numeral 44).

Control proceeds to block 1010, in which the primary storage controller 22 responds to the host 26 indicating that the write command is satisfied, via the fabric 28, and in Fibre Channel frames of the response indicates the identical priority (also shown in FIG. 1 via reference numeral 46, 48).

It may be noted that block 1004 is part of a first exchange pair 1012, blocks 1006 and 1008 are part of a second exchange pair 1014, and block 1010 is part of third exchange pair 1016.

Therefore, FIG. 10 illustrates certain embodiments for maintaining priority of Fibre Channel frames in a computing environment 20 in which synchronous copy is performed. The computing environment in which synchronous copy is performed may be referred to as a synchronous copy environment. FICON has been used for illustrative purposes. Other protocols that use Fibre Channel frames may be used in alternative embodiments.

FIG. 11 illustrates a fifth flowchart that shows operations performed for maintaining priority during synchronous copy from a primary to a secondary storage controller, in accordance with certain embodiments. The operations shown in FIG. 11 may best be understood with reference to elements described in FIG. 1.

Control starts at block 1102 in which a primary storage controller 22 receives a write command from a host 26, wherein Fibre Channel frames corresponding to the write command have a priority indicated by the host 26. The primary storage controller 22 performs (at block 1104) a synchronous copy operation 29 to copy data written by the write command from the primary storage controller 22 to a secondary storage controller 24, wherein Fibre Channel frames corresponding to the synchronous copy operation have an identical priority to the priority indicated by the host 26.

In certain embodiments, in a Fibre Connection (FICON) protocol implemented over Fibre Channel, all Fibre Channel frames of all related exchanges pairs that satisfy the write command are set to the identical priority corresponding to the priority indicated by the host. In block 1104, the priority for the synchronous copy operation is determined by recording the priority of the write command in an input/output (I/O) task control block 50 maintained in the primary storage controller 22, where the recorded priority is copied to a copy services task control block 52 to transfer the recorded priority for the synchronous copy operation.

In certain embodiments shown in FIG. 11 the priority is indicated by programming a CS_CTL/Priority field in a frame headers corresponding to one Fibre Channel frame. The Fibre Channel frames may be included in exchanges of embodiments related to the FICON protocol.

Therefore FIGS. 1-11 illustrate certain embodiments in which priority is maintained for Fibre Channel frames in a synchronous copy environment in FICON and other protocols.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Referring now to FIG. 12, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the priority maintaining applications 68 (e.g., the host applications 32, 110 and the storage controller applications 34, 36, 112) as shown in FIGS. 1-11.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

FIG. 14 illustrates a block diagram that shows certain elements that may be included in the hosts 26, 104 or storage controllers 22, 24, 102 in accordance with certain embodiments. The system 1400 may include a circuitry 1402 that may in certain embodiments include at least a processor 1404. The system 1400 may also include a memory 1406 (e.g., a volatile memory device), and storage 1408. The storage 1408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1408 may comprise an internal storage device, an attached storage device and/or a network accessible storage device. The system 1400 may include a program logic 1410 including code 1412 that may be loaded into the memory 1406 and executed by the processor 1404 or circuitry 1402. In certain embodiments, the program logic 1410 including code 1412 may be stored in the storage 1408. In certain other embodiments, the program logic 1410 may be implemented in the circuitry 1402. Therefore, while FIG. 14 shows the program logic 1410 separately from the other elements, the program logic 1410 may be implemented in the memory 1406 and/or the circuitry 1402.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
   receiving, by a primary storage controller, a write command from a host, wherein frames corresponding to the write command have a priority indicated by the host; and
   performing, by the primary storage controller, a synchronous copy operation to copy data written by the write command from the primary storage controller to a secondary storage controller, wherein frames corresponding to the synchronous copy operation have an identical priority to the priority indicated by the host, wherein all frames of all related exchanges pairs that satisfy the write command are set to the identical priority corresponding to the priority indicated by the host, wherein the priority is a fabric priority that is indicated by programming a field in a frame header corresponding to one frame of a communications protocol, wherein an exchange pair is comprised of an inbound exchange and an outbound exchange, wherein each of an inbound and an outbound exchange is comprised of one or more sequences, and wherein each sequence is comprised of one or more frames.

2. The method of claim 1, wherein the write command is satisfied by:
   a first exchange pair to write the data to the primary storage controller;
   a second exchange pair to perform the synchronous copy operation; and
   a third exchange pair to respond from the primary storage controller to the host that the write command is satisfied, wherein:
     frames of the first exchange pair, the second exchange pair, and the third exchange pair all have the identical priority corresponding to the priority indicated by the host.

3. The method of claim 1, the method further comprising:
   recording the priority of the write command in an input/output (I/O) task control block maintained in the primary storage controller; and
   copying the recorded priority to a copy services task control block to transfer the recorded priority for the synchronous copy operation.

4. The method of claim 1, wherein:
   the primary storage controller and the secondary storage controller control a plurality of storage devices; and
   a fabric comprising one of more switches couples the primary storage controller, the secondary storage controller and the host.

5. The method of claim 4, the method further comprising:
   transmitting, by the fabric, the frames corresponding to the write command according to and with the priority indicated by the host to the primary storage controller; and
   transmitting, by the fabric, the frames corresponding to the synchronous copy operation according to and with the identical priority indicated by the primary storage controller to the secondary storage controller.

6. A system comprising a primary storage controller, wherein the primary storage controller is coupled to a host and a secondary storage controller, the system comprising:
   a memory; and
   a processor coupled to the memory, wherein the processor performs operations, the operations comprising:
     receiving, by the primary storage controller, a write command from the host, wherein frames corresponding to the write command have a priority indicated by the host; and
     performing, by the primary storage controller, a synchronous copy operation to copy data written by the write command from the primary storage controller to the secondary storage controller, wherein frames corresponding to the synchronous copy operation have an identical priority to the priority indicated by the host, wherein all frames of all related exchanges pairs that satisfy the write command are set to the identical priority corresponding to the priority indicated by the host, wherein the priority is a fabric priority that is indicated by programming a field in a frame header corresponding to one frame of a communications protocol, wherein an exchange pair is comprised of an inbound exchange and an outbound exchange, wherein each of an inbound and an outbound exchange is comprised of one or more sequences, and wherein each sequence is comprised of one or more frames.

7. The system of claim 6, wherein the write command is satisfied by:
   a first exchange pair to write the data to the primary storage controller;
   a second exchange pair to perform the synchronous copy operation; and
   a third exchange pair to respond from the primary storage controller to the host that the write command is satisfied, wherein:
     frames of the first exchange pair, the second exchange pair, and the third exchange pair all have the identical priority corresponding to the priority indicated by the host.

8. The system of claim 6, the operations further comprising:
   recording the priority of the write command in an input/output (I/O) task control block maintained in the primary storage controller; and
   copying the recorded priority to a copy services task control block to transfer the recorded priority for the synchronous copy operation.

9. The system of claim 6, wherein:
   the primary storage controller and the secondary storage controller control a plurality of storage devices; and
   a fabric comprising one of more switches couples the primary storage controller, the secondary storage controller and the host.

10. The system of claim 9, the operations further comprising:
    transmitting, by the fabric, the frames corresponding to the write command according to and with the priority indicated by the host to the primary storage controller; and
    transmitting, by the fabric, the frames corresponding to the synchronous copy operation according to and with the identical priority indicated by the primary storage controller to the secondary storage controller.

11. A computer program product, comprising:
    a computer readable storage medium having computer readable program code embodied therewith, the computer readable program code configured to perform operations on a processor, the operations comprising:
    receiving, by a primary storage controller, a write command from a host, wherein frames corresponding to the write command have a priority indicated by the host; and
    performing, by the primary storage controller, a synchronous copy operation to copy data written by the write command from the primary storage controller to a secondary storage controller, wherein frames corresponding to the synchronous copy operation have an identical priority to the priority indicated by the host, wherein all frames of all related exchanges pairs that satisfy the write command are set to the identical priority corresponding to the priority indicated by the host, wherein the priority is a fabric priority that is indicated by programming a field in a frame header corresponding to one frame of a communications protocol, wherein an exchange pair is comprised of an inbound exchange and an outbound exchange, wherein each of an inbound and an outbound exchange is comprised of one or more sequences, and wherein each sequence is comprised of one or more frames.

12. The computer program product of claim 11, wherein the write command is satisfied by:
    a first exchange pair to write the data to the primary storage controller;
    a second exchange pair to perform the synchronous copy operation; and
    a third exchange pair to respond from the primary storage controller to the host that the write command is satisfied, wherein:
        frames of the first exchange pair, the second exchange pair, and the third exchange pair all have the identical priority corresponding to the priority indicated by the host.

13. The computer program product of claim 11, the operations further comprising:
    recording the priority of the write command in an input/output (I/O) task control block maintained in the primary storage controller; and
    copying the recorded priority to a copy services task control block to transfer the recorded priority for the synchronous copy operation.

14. The computer program product of claim 11, wherein:
    the primary storage controller and the secondary storage controller control a plurality of storage devices; and
    a fabric comprising one of more switches couples the primary storage controller, the secondary storage controller and the host.

15. The computer program product of claim 14, the operations further comprising:
    transmitting, by the fabric, the frames corresponding to the write command according to and with the priority indicated by the host to the primary storage controller; and
    transmitting, by the fabric, the frames corresponding to the synchronous copy operation according to and with the identical priority indicated by the primary storage controller to the secondary storage controller.

* * * * *